US 6,675,236 B2

(12) United States Patent
Moon et al.

(10) Patent No.: US 6,675,236 B2
(45) Date of Patent: Jan. 6, 2004

(54) FIELD BUS INTERFACE BOARD

(75) Inventors: Bong-Chae Moon, Seongnam (KR); Seung-Ho Hong, Seoul (KR); In-Ho Choi, Seoul (KR)

(73) Assignee: Samsung Electronics Co., Ltd., Suwon (KR)

( * ) Notice: Subject to any disclaimer, the term of this patent is extended or adjusted under 35 U.S.C. 154(b) by 270 days.

(21) Appl. No.: 09/960,934

(22) Filed: Sep. 25, 2001

(65) Prior Publication Data
US 2003/0009608 A1 Jan. 9, 2003

(30) Foreign Application Priority Data
Jul. 6, 2001 (KR) ........................................ 2001-40379

(51) Int. Cl.[7] .......................... G06F 13/14; G06F 13/20; G06F 13/40
(52) U.S. Cl. ............................. 710/29; 710/33; 710/52; 710/305; 710/310
(58) Field of Search ............................. 710/29, 33, 52, 710/305, 310

(56) References Cited

U.S. PATENT DOCUMENTS

| 5,758,075 A | * | 5/1998 | Graziano et al. ........... 709/250 |
| 5,764,891 A | | 6/1998 | Warrior ................... 395/200.2 |
| 6,105,086 A | * | 8/2000 | Doolittle et al. ............. 710/52 |
| 6,151,640 A | * | 11/2000 | Buda et al. .................. 710/11 |
| 6,463,338 B1 | * | 10/2002 | Neet .......................... 700/17 |

* cited by examiner

Primary Examiner—Rehana Perveen
(74) Attorney, Agent, or Firm—Staas & Halsey LLP

(57) ABSTRACT

A field bus interface board is disclosed. The field bus interface board installed in a computer and connected to a field bus line has a main controller for controlling the entire operation of the field bus interface board. A field bus controller controls a data transmission and reception though the field bus line. A dual-port memory is shared between the computer and the main controller for exchanging data with the computer. A buffer memory buffers data transmitted to the field bus line or received from the field bus line, under the control of the field bus controller. A field bus interfacing means transmits data to the field bus line or receives data from the field bus line, under the control of the field bus controller.

6 Claims, 5 Drawing Sheets

FIELD BUS INTERFACE BOARD

BACKGROUND OF THE INVENTION

1. Field of the Invention

The present invention relates in general to a field bus interface board, and more particularly to a field bus interface board for performing a digital communication between various kinds of sensors and actuators in control fields.

2. Description of the Prior Art

Recently, field bus interface techniques have been proposed and used for interfacing with digital serial communication devices or methods used in control fields for factory automation, in other words, for controlling control machines, sensors, and actuators.

FIG. 1 is a block diagram showing a conventional field bus interface board.

Referring to FIG. 1, the conventional field bus interface board includes a microcontroller 1, latches 2 and 2a, a first decoder 5, a first bi-directional bus transceiver 6, a second bi-directional bus transceiver 6a, a Manchester encode/decoder 9, first and second latch/shift registers 7 and 8, an interface 10, a CRC generator/checker 11, and a personal computer interface 12. The microcontroller 1 has a ROM 1a storing programs for information exchange and an input/output port, and outputs an address for storing information data and an address latch enable signal ALE. The latches 2 and 2a separate the address received by the microcontroller 1 into lower bytes and higher bytes addresses LOW ADDR and HIGH ADDR, respectively, and latch them for a predetermined period of time, in response to the address latch enable signal ALE. The first decoder 5 decodes the lower and high bytes addresses received through the latches 2 and 2a, and outputs a chip select signal CS to a chip select terminal of a system RAM 3 or a dual-port RAM 4. The first bus transceiver 6 transmits lower bytes data LOW DATA received by the microcontroller 1 to the system RAM 3 and the dual-port RAM 4. The second bus transceiver 6a transmits higher bytes data HIGH DATA received by the microcontroller 1 to both the system RAM 3 and the dual-port RAM 4. The Manchester encoder/decoder 9 Manchester-encodes an input data or Manchester-decodes the Manchester-encoded data. The first and second latch/shift registers 7 and 8 are commonly connected to the system RAM 3, the dual-port RAM 4 and the Manchester encoder/decoder 9. The interface 10 matches data transmitted/received between the Manchester encode/decoder 9 and a field bus (not shown). The CRC generator/checker 11 checks whether an error is generated in data. The personal computer interface 12 interfaces with a computer (not shown) for transmitting and receiving data.

The conventional field bus interface board having the above construction controls its operation and field bus communication under the control of the microcontroller 1. Accordingly, the conventional field bus interface board is problematic in that the microcontroller performs the operation of the board itself and field bus communication with a softwareable method simultaneously, thus complicating its construction, and increasing data amounts to be processed by the microcontroller, and thereby, decreasing the processing speed of the interface board.

SUMMARY OF THE INVENTION

Therefore, the present invention has been made in view of the above problem, and it is an object of the present invention to provide a field bus interface board for improving its processing speed and its communication speed by simplifying its construction and reducing a load of its control unit.

In accordance with one aspect of the present invention, the above and other objects can be accomplished by the provision of a field bus interface board installed in a computer and connected to a field bus line, comprising a main controller for controlling an entire operation of the field bus interface board; a field bus controller for controlling a data transmission and reception though the field bus line; a dual-port memory shared between the computer and the main controller for exchanging data with the computer; a buffer memory for buffering data transmitted to the field bus line or received from the field bus line, under the control of the field bus controller; and a field bus interfacing means for transmitting data to the field bus line or receiving data from the field bus line, under the control of the field bus controller.

BRIEF DESCRIPTION OF THE DRAWINGS

The above and other objects, features and advantages of the present invention will be more clearly understood from the following detailed description taken in conjunction with the accompanying drawings, in which.

DETAILED DESCRIPTION OF THE PREFERRED EMBODIMENTS

Figure 1:
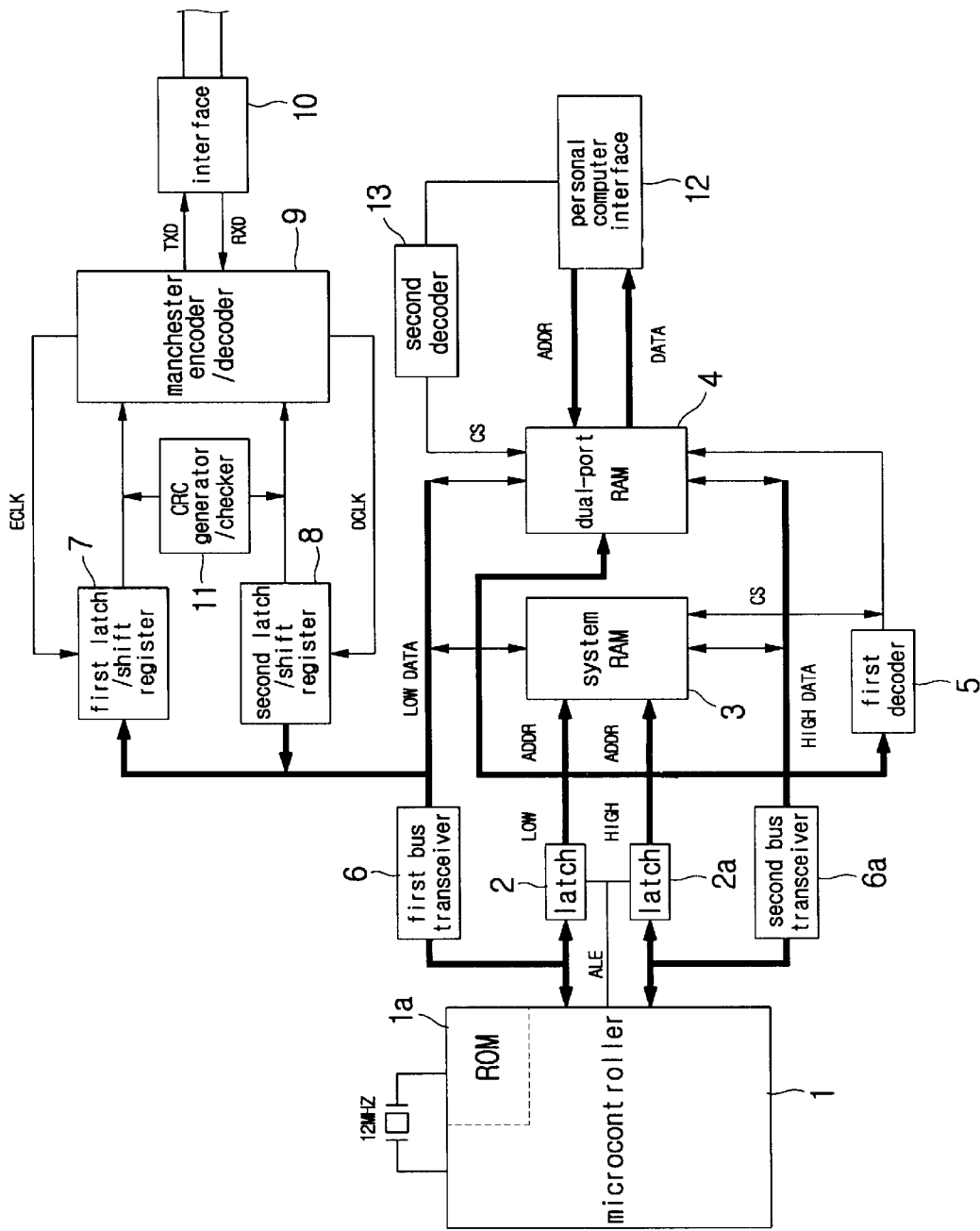
FIG. 1 is a block diagram showing the conventional field bus interface board.
Figure 2:
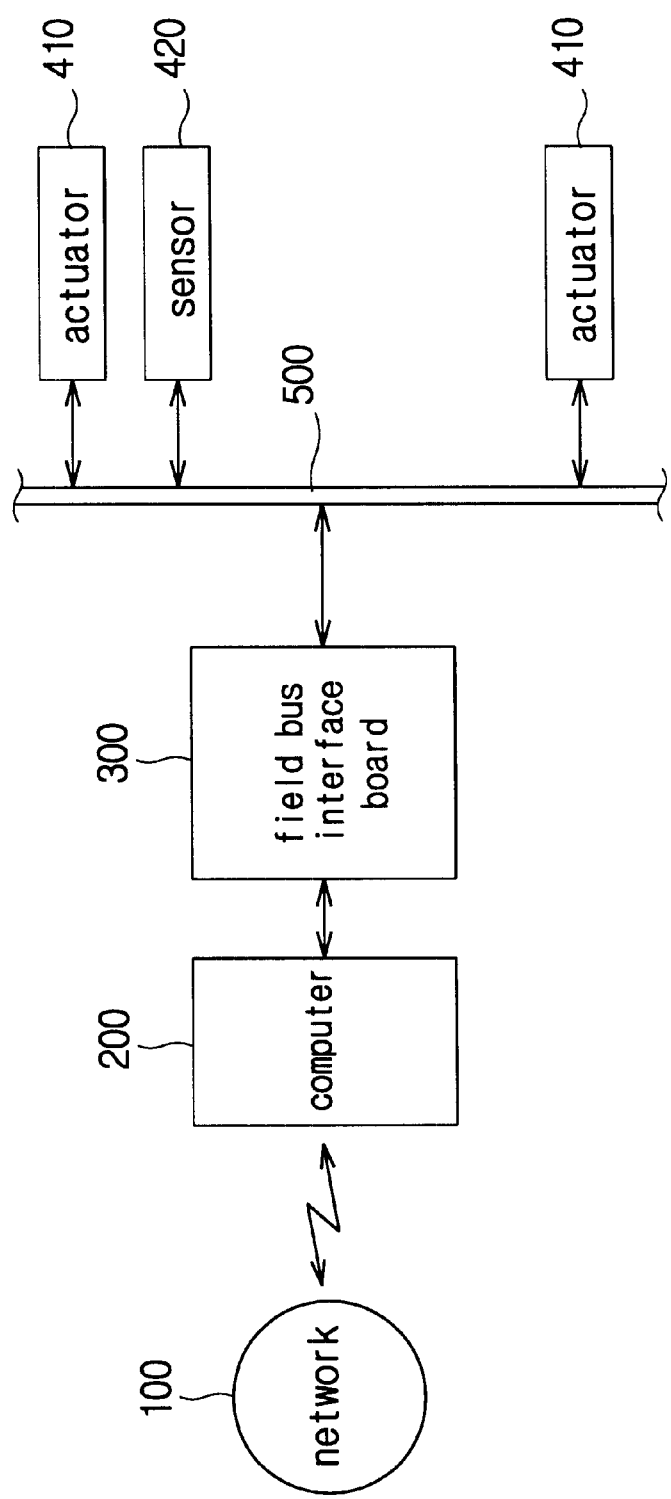
FIG. 2 is a block diagram showing a field bus interface board according to the preferred embodiment of the present invention.

FIG. 2 is a block diagram showing a field bus interface board connected to a computer, according to the preferred embodiment of the present invention.

Referring to FIG. 2, the field bus interface board 300 is installed in a computer 200, and is connected to a field bus line 500 connected to various kinds of actuators 410 and sensors 420. Further, the computer 200, in which the field bus interface board 300 is installed, is connected to a network 100 through a network adapter, as will be described later.

Figure 3:
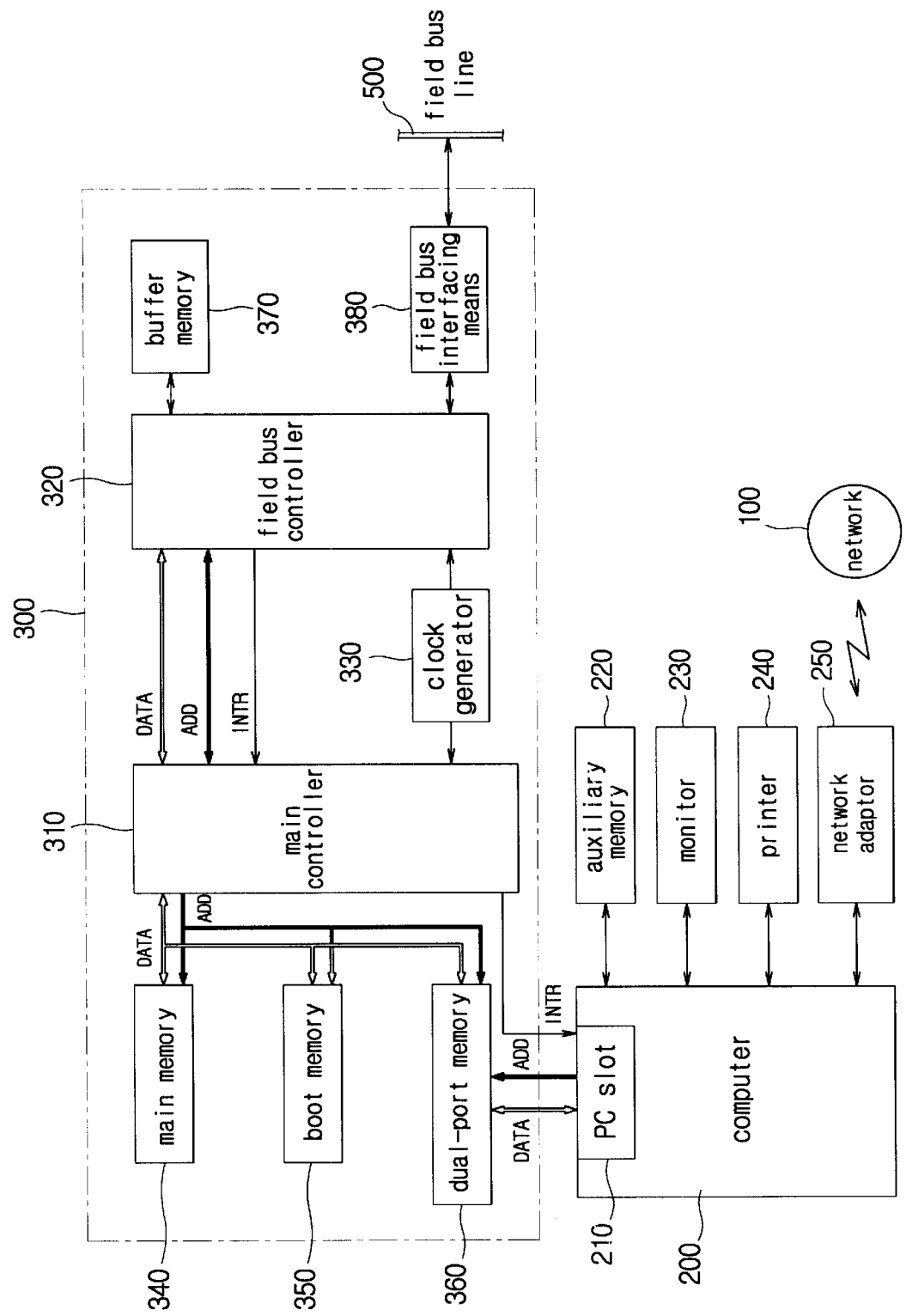
FIG. 3 is a detailed block diagram showing the field bus interface board of this invention.

FIG. 3 is a detailed block diagram showing the field bus interface board 300 of this invention.

Referring to FIG. 3, the field bus interface board 300 comprises a main controller 310 for controlling an entire operation of the board 300, and a field bus controller 320 for controlling the data transmission/reception through a field bus line.

The field bus interface board 300 further comprises a clock generator 330, a main memory 340, a boot memory 350, and a dual-port memory 360. The clock generator 330 generates a clock signal and provides the clock signal to both the main controller 310 and the field bus controller 320. The main memory 340 is used for processing data required to operate the main controller 310. The boot memory 350 stores the operation program of the main controller 310. The dual-port memory 360 is shared between the computer 200 and the main controller 310 for exchanging data with the computer 200.

The field bus interface board 300 further comprises a buffer memory 370 and a field bus interfacing means 380. The buffer memory 370 buffers the data transmitted to the field bus line 500 or received from the field bus line 500, under the control of the field bus controller 320. The field bus interfacing means 380 transmits data to the field bus line 500 or receives data from the field bus line 500, under the control of the field bus controller 320.

Preferably, an address of the dual-port memory 360 is mapped to a memory address used in an operating system of the computer 200. In such a case, the dual-port memory 360 is shared between the computer 200 and the main controller 310.

The computer 200 has a PC slot 210, an auxiliary memory 220, a monitor 230, a printer 240, and a network adaptor 250. The PC slot 210 is connected to the field bus interface board 300. The auxiliary memory 220 stores application programs necessary for the operating system and control of the field bus. The monitor 230 displays a variety of information visually, and the network adaptor 250 is used for interfacing with the network 100.

Figure 4:
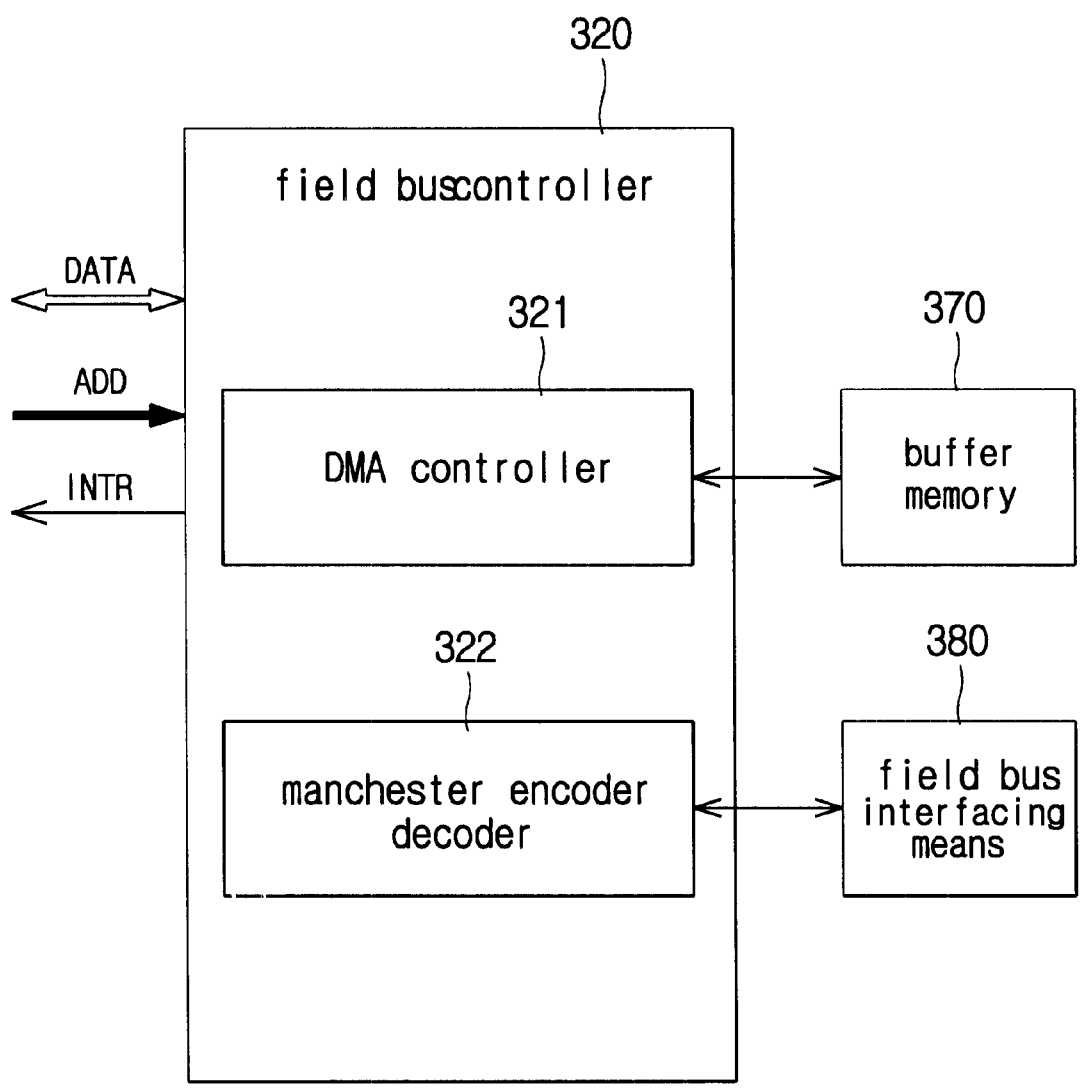
FIG. 4 is a block diagram showing a field bus controller of this invention.

FIG. 4 is a block diagram showing the field bus controller 320 of this invention.

Referring to FIG. 4, the field bus controller 320 includes a Direct Memory Access (DMA) controller 321 for directly controlling the buffer memory 370. Thereby, the field bus controller 320 can access the buffer memory 370 for reading or writing data without control of the main controller 310, thus reducing a load of the main controller 310. The field bus controller 320 further includes a Manchester encoder/decoder 322 for encoding and decoding data transmitted and received to/from the field bus line 500, respectively.

Figure 5:
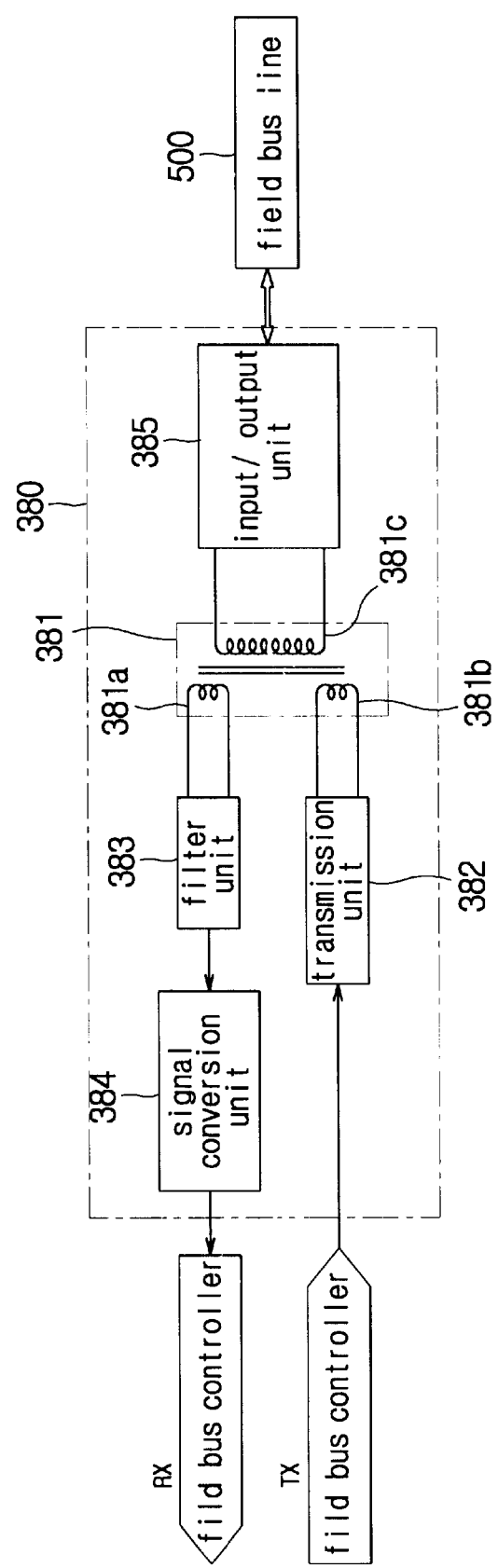
FIG. 5 is a block diagram showing a field bus interfacing means of this invention.

FIG. 5 is a block diagram showing the field bus interfacing means 380 of this invention.

Referring to FIG. 5, the field bus interfacing means 380 has a signal insulation unit for insulating an input/output signal of the field bus interfacing means 380. In the present invention, as an example, the signal insulation unit is realized as a pulse transformer 381. As another example, the insulation unit can be preferably realized as a photo-coupler. The pulse transformer 381 consists of two primary coils 381a and 381b, and one secondary coil 381c.

The secondary coil 381c of the pulse transformer 381 is connected to an input/output unit 385 having an output terminal connected to the field bus line 500 for transmitting/receiving data. The two primary coils 381a, 381b are connected to a filter unit 383 and a transmission unit 382, respectively.

The transmission unit 382 amplifies a digital signal from the field bus controller 320, and the filter unit 383 removes noise component of the received signal. An output terminal of the filter unit 383 is connected to a signal conversion unit 384 for converting an output signal of the filter unit 383 into a regular digital signal, and transmitting the digital signal to the field bus controller 320.

Hereinafter, the operation of the field bus interface board is described in detail.

The application program operated in the operating system of the computer 200 transmits data to a memory address predefined for the dual-port memory 360. Accordingly, the data is transmitted to a corresponding address of the dual-port memory 360 through the PC slot 210 of the computer 200. At this time, the main controller 310 of the field bus interface board 300 loads data stored in the dual-port memory 360. The main controller 310 of the field bus interface board 300 loads data stored in the dual-port memory 360. The main controller 310 designates an address assigned to the field bus controller 320 by the same method as that of accessing the main memory 340, and transmits data through a data bus.

Then, the field bus controller 320 recognizes the designated address and receives the data through the data bus. At this time, the field bus controller 320 controls the buffer memory 370 through the DMA controller 321 to store the data received through the data bus in the buffer memory 370. After the data is stored in the buffer memory 370, the field bus controller 320 encodes the data by the Manchester encoder/decoder 322, and transmits the encoded data to the field bus interfacing means 380(TX).

The transmitting unit 382 amplifies the data transmitted to the field bus interfacing means 380, and transmits the amplified data to the pulse transformer 381. The transmitted data is induced in the secondary coil 381c of the pulse transformer 381. The data induced in the secondary coil 381c is transmitted to the field bus line 500 through the input/output unit 385.

On the other hand, the data from the field bus line, in other words, the received data, is transmitted to the pulse transformer 381 through the input/output unit 385. Accordingly, the received data is induced from the secondary coil 381c in the primary coil 381a, and is transmitted to the filter unit 383.

The filter unit 383 removes the electric noise component or noise component caused by signal interference from the received data, and outputs a noise-removed signal to the signal conversion unit 384. The signal conversion unit 384 converts the noise-removed signal from the filter unit 383 into a regular pulse signal, and transmits the pulse signal to the field bus controller 320(RX).

The field bus controller 320 receives data from the field bus interfacing means 380. The field bus controller 320 decodes the received data by the Manchester encoder/decoder 322. The decoded data is stored in the buffer memory 370 through the DMA controller 321 controlled by the field bus controller 320.

Further, the field bus controller 320 generates an interrupt signal INTR. When the field bus controller 320 generates the interrupt signal INTR, the main controller 310 designates an address assigned to the field bus controller 320. When the address is designated, the field bus controller 320 transmits the data stored in the buffer memory 370 to the data bus DATA. Then, the main controller 310 receives the data through the data bus DATA, stores the data in the dual-port memory 360, and transmits the interrupt signal INTR to the computer 20.

When receiving the interrupt signal INTR, the computer 200 designates an address of the dual-port memory 360, and loads data. The application program processes the data, and then the computer 200 displays the processed data on the monitor 230 or outputs the processed data through the printer 240. Also, the computer 200 may transmit the processed data to the network 100 through the network adapter 250.

As described above, the present invention can perform a control and communication of a dispersed system through one field bus interface board, and thereby may collect all kinds of data currently transmitted on the network. Then, the present invention can manage a control and communication of the dispersed system effectively and integrately.

As apparent from the above description, the present invention provides a field bus interface board, in which its filed bus controller directly manages data transmitted/received through a field bus line, thus reducing a load of a main controller. Accordingly the present invention is advantageous in that it increases its data processing speed, and provides a significantly improved high speed communication, compared with products using the conventional field bus interface board, in addition to processing data more reliably. Further, the present invention is advantageous in that it can perform a control and communication of a dispersed system through one field bus interface board effectively, and thereby collect all kinds of data currently transmitted on the network, thus enabling the control and communication of the dispersed system to be managed effectively and integrately.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A field bus interface board installed in a computer and connected to a field bus line, comprising:
    a main controller for controlling an entire operation of the field bus interface board;
    a field bus controller for controlling a data transmission and reception though the field bus line;
    a dual-port memory shared between the computer and the main controller for exchanging data with the computer;
    a buffer memory for buffering data transmitted to the field bus line or received from the field bus line, under the control of the field bus controller; and
    field bus interfacing means for transmitting data to the field bus line or receiving data from the field bus line, under the control of the field bus controller.

2. The field bus interface board as set forth in claim 1, further comprising a clock generator for providing a clock signal to both the main controller and the field bus controller, a main memory for processing data required to operate the main controller, and a boot memory for storing an operation program of the main controller.

3. The field bus interface board as set forth in claim 1, wherein the field bus controller is connected to a data bus and is assigned a corresponding address, and the main controller designates the corresponding address for controlling the field bus controller.

4. The field bus interface board as set forth in claim 1, wherein the field bus controller includes a DMA controller for directly controlling the buffer memory, and a Manchester encoder/decoder for encoding and decoding the data transmitted/received through the field bus line.

5. The field bus interface board as set forth in claim 1, wherein the field bus interfacing means includes:
    a pulse transformer having a primary transmitting coil and primary and secondary receiving coils for insulating an input/output signal of the field bus interfacing means;
    an input/output unit connected to the secondary receiving coil, and having an output terminal connected to the field bus line for transmitting/receiving data;
    a transmitting unit connected to the primary transmitting coil for amplifying a signal received from the field bus controller;
    a filter unit connected to the primary receiving coil for removing a noise component from the received signal; and
    a signal conversion unit for converting a noise-removed signal from the filter unit into a regular digital signal, and transmitting the digital signal to the field bus controller.

6. The field bus interface board as set forth in claim 1, wherein an address of the dual-port memory is mapped to a memory address used in an operating system of the computer, such that the dual-port memory is shared between the computer and the main controller.

* * * * *